(12) United States Patent
Yoshida

(10) Patent No.: US 11,951,923 B2
(45) Date of Patent: Apr. 9, 2024

(54) VEHICLE TURN-OVER DETERMINATION APPARATUS AND VEHICLE

(71) Applicant: SUBARU CORPORATION, Tokyo (JP)

(72) Inventor: Shouichi Yoshida, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 18/054,371

(22) Filed: Nov. 10, 2022

(65) Prior Publication Data

US 2023/0202416 A1 Jun. 29, 2023

(30) Foreign Application Priority Data

Nov. 19, 2021 (JP) ................... 2021-188301

(51) Int. Cl.
*B60R 21/013* (2006.01)
*B60R 21/0132* (2006.01)
*B60R 21/13* (2006.01)

(52) U.S. Cl.
CPC .......... *B60R 21/0132* (2013.01); *B60R 21/13* (2013.01); *B60R 2021/01304* (2013.01); *B60R 2021/01306* (2013.01); *B60R 2021/01322* (2013.01); *B60R 2021/01327* (2013.01)

(58) Field of Classification Search
CPC .............. B60R 21/0132; B60R 21/13; B60R 2021/01304; B60R 2021/01306; B60R 2021/01322; B60R 2021/01327
USPC ......................................... 701/38, 45, 65, 72
See application file for complete search history.

(56) References Cited

U.S. PATENT DOCUMENTS

| 2002/0087235 A1* | 7/2002 | Aga ..................... B60R 16/0233 701/1 |
| 2009/0037057 A1* | 2/2009 | Sygnarowicz ....... B60G 17/018 701/46 |
| 2011/0006890 A1* | 1/2011 | Le ....................... B60R 21/0132 340/440 |

(Continued)

FOREIGN PATENT DOCUMENTS

| JP | 2001-171481 A | 6/2001 |
| JP | 2007-216747 A | 8/2007 |

*Primary Examiner* — Erick R Solis
(74) *Attorney, Agent, or Firm* — Rimon P.C.

(57) ABSTRACT

A vehicle turn-over determination apparatus includes a turn-over sensor, a memory, a determination processor, and a road-surface detector. The turn-over sensor detects a value of a turn-over angle or a turn-over velocity of a vehicle. The determination processor performs the determination of the turn-over of the vehicle on the basis of the value detected by the turn-over sensor and the determination-threshold information held in the memory. The road-surface detector detects a road surface that is present in a traveling direction of the vehicle. The determination processor varies the determination-threshold information acquired from the memory in accordance with an inclination of the road surface detected by the road-surface detector, and thereby generates adjusted-threshold information adjusted in accordance with the inclination of the road surface. The determination processor compares the adjusted-threshold information and the detected value with each other, and thereby perform the determination of the turn-over of the vehicle.

4 Claims, 6 Drawing Sheets

(56) References Cited

U.S. PATENT DOCUMENTS

| | | | |
|---|---|---|---|
| 2013/0090804 A1* | 4/2013 | Oda | B60W 50/04 701/33.4 |
| 2013/0332032 A1* | 12/2013 | Korn | B60R 21/0132 701/45 |
| 2015/0006022 A1* | 1/2015 | Hsu | G07C 5/08 701/32.2 |
| 2015/0274105 A1* | 10/2015 | Le Merrier | B60W 30/085 701/45 |
| 2020/0017049 A1* | 1/2020 | Kobayashi | G08G 1/13 |
| 2021/0291770 A1* | 9/2021 | Bartlett | B60R 21/23 |
| 2023/0116504 A1* | 4/2023 | Bartlett | B60R 21/01 701/45 |

\* cited by examiner

DETERMINATION-THRESHOLD INFORMATION REGARDING
ROLLOVER ANGLE TO BE RECORDED IN MEMORY
(SETS OF COMBINATION INFORMATION)

| ROLL ANGLE DIRECTION | COMBINATION INFORMATION (DETERMINATION-THRESHOLD INFORMATION REGARDING ROLLOVER ANGLE) | |
|---|---|---|
| | DETERMINATION PROCESS EXECUTION CONDITION | ROLLOVER DETERMINATION CONDITION |
| LEFT | ROLL ANGLE ≥ D1 | ROLL VELOCITY ≥ V1 |
| | ROLL VELOCITY ≥ V2 | ROLL ANGLE ≥ D2 |
| | NONE OF ABOVE | GREATER THAN OR EQUAL TO THRESHOLDS ON INCLINED LINE SEGMENT |
| RIGHT | ROLL ANGLE ≥ D3 | ROLL VELOCITY ≥ V3 |
| | ROLL VELOCITY ≥ V4 | ROLL ANGLE ≥ D4 |
| | NONE OF ABOVE | GREATER THAN OR EQUAL TO THRESHOLDS ON INCLINED LINE SEGMENT |

IN THIS ORDER ↓

IN THIS ORDER ↓

FIG. 5

VEHICLE TURN-OVER DETERMINATION APPARATUS AND VEHICLE

CROSS-REFERENCE TO RELATED APPLICATIONS

The present application claims priority from Japanese Patent Application No. 2021-188301 filed on Nov. 19, 2021, the entire contents of which are hereby incorporated by reference.

BACKGROUND

The disclosure relates to a vehicle turn-over determination apparatus and a vehicle.

A vehicle such as an automobile sometimes rolls over due to a cause such as a disturbance during traveling.

To address this, some vehicles are provided with an apparatus that determines a turn-over such as a rollover of the vehicle. For example, reference is made to Japanese Unexamined Patent Application Publication (JP-A) Nos. 2007-216747 and 2001-171481.

SUMMARY

An aspect of the disclosure provides a vehicle turn-over determination apparatus that includes a turn-over sensor, a memory, a determination processor, and a road-surface detector. The turn-over sensor is configured to detect a value of a turn-over angle or a turn-over velocity of a vehicle. The memory is configured to hold determination-threshold information to be used in a determination of a turn-over of the vehicle. The determination processor is configured to perform the determination of the turn-over of the vehicle on the basis of the value detected by the turn-over sensor and the determination-threshold information held in the memory. The road-surface detector is configured to detect a road surface that is present in a traveling direction of the vehicle. The determination processor is configured to acquire the determination-threshold information from the memory. The determination processor is configured to vary the determination-threshold information acquired from the memory in accordance with an inclination of the road surface which is present in the traveling direction of the vehicle and detected by the road-surface detector, and thereby generate adjusted-threshold information adjusted in accordance with the inclination of the road surface. The determination processor is configured to compare the adjusted-threshold information and the value detected by the turn-over sensor with each other, and thereby perform the determination of the turn-over of the vehicle.

An aspect of the disclosure provides a vehicle that includes the vehicle turn-over determination apparatus and an onboard device. The onboard device is operable upon the turn-over of the vehicle. The onboard device includes an occupant protection device. The onboard device is configured to operate in a case where the vehicle turn-over determination apparatus determines the turn-over of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 5 is an explanatory diagram for describing sets of determination-threshold information related to a rollover that are to be recorded in a memory illustrated in FIG. 3 and for describing a determination procedure based on the sets of the determination-threshold information.

DETAILED DESCRIPTION

Figure 1:
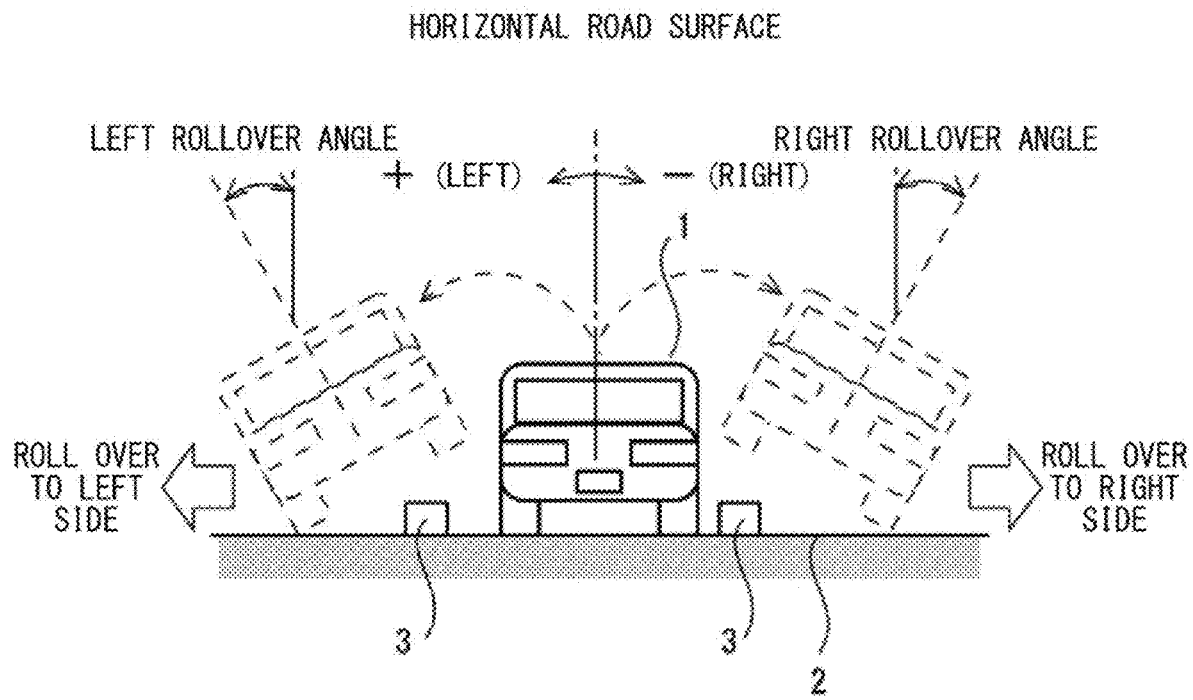
FIG. 1 is an explanatory diagram for describing a traveling state of a vehicle to which one example embodiment of the disclosure is applicable.

In a vehicle turn-over determination disclosed in JP-A Nos. 2007-216747 and 2001-171481, a factor such as a roll angle indicating an inclination of a vehicle body is detected, and a detected value is compared with a threshold to thereby determine a state such as a turn-over.

In such a case where the turn-over is determined by comparing a single detected value and a single threshold corresponding thereto, it is not always possible to favorably determine various turn-overs that the vehicle can actually undergo.

For example, if it is difficult to determine that the vehicle is to turn over in a situation where the vehicle actually turns over, the turn-over determination may be insufficient.

For example, if it is determined that the vehicle is to turn over in a situation where the vehicle actually does not turn over, the turn-over determination may be excessive.

It is desirable to provide a vehicle turn-over determination apparatus and a vehicle that are each able to favorably determine various turn-overs that a vehicle can undergo.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 is an explanatory diagram for describing a traveling state of a vehicle 1 to which an example embodiment of the disclosure is applicable. For example, the vehicle 1 may be an automobile.

FIG. 1 illustrates a rear view of the vehicle 1 traveling on a road surface 2 that is horizontal. The road surface 2 has curbs 3 on left and right sides of the vehicle 1. If a traveling direction of the vehicle 1 deviates to the right side or the left side in such a situation, the vehicle 1 may come into contact with the curb 3.

For example, if the vehicle 1 comes into great contact with the curb 3 to drive over the curb 3, the vehicle 1 can roll over. In such a manner, the vehicle 1 can sometimes roll over due to a cause such as a disturbance during traveling. The vehicle 1 can turn upside down due to a cause such as a rollover during traveling.

Figure 2:
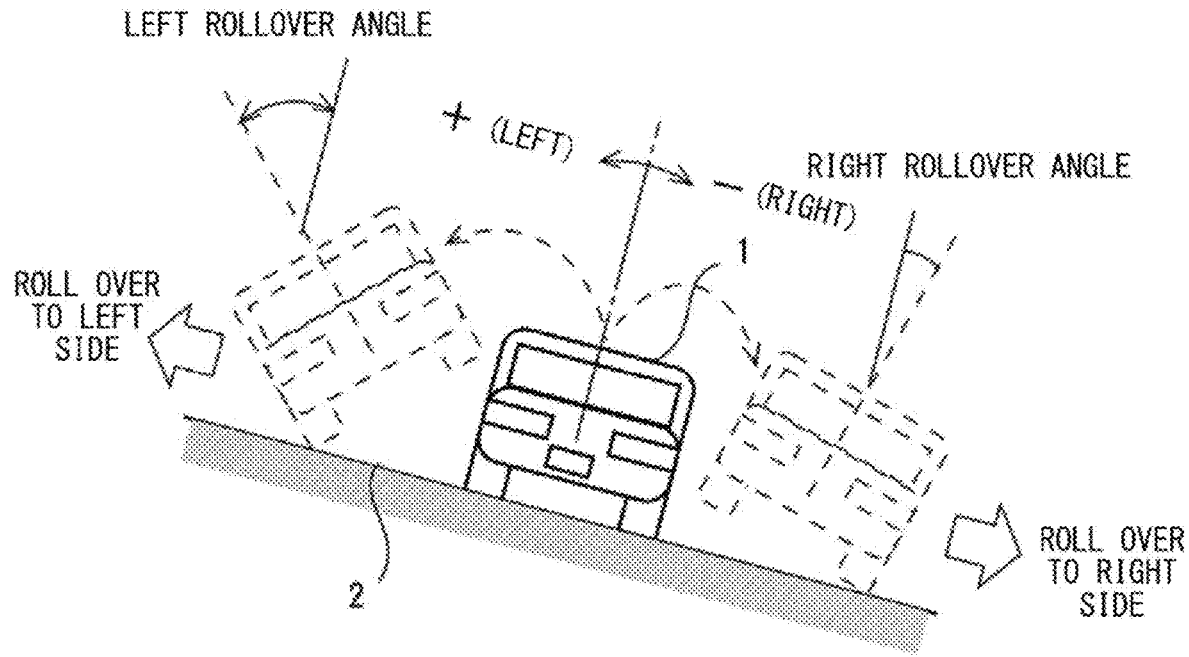
FIG. 2 is an explanatory diagram for describing a state in which the vehicle illustrated in FIG. 1 is traveling on a road surface that descends rightward.

FIG. 2 is an explanatory diagram for describing a state in which the vehicle 1 illustrated in FIG. 1 is traveling on a road surface 2 that descends rightward.

FIG. 2 also illustrates the rear view of the vehicle 1 as with FIG. 1, but differs from FIG. 1 in that the vehicle 1 is traveling on the road surface 2 that descends rightward in a left-right direction.

In such a case where the vehicle 1 is traveling on the road surface 2 that descends rightward or leftward also, the vehicle 1 can turn upside down due to a cause such as a rollover.

However, as illustrated in FIGS. 1 and 2, a right rollover angle that causes a rollover of the vehicle 1 to the right side and a left rollover angle that causes a rollover of the vehicle 1 to the left side may differ depending on an inclination of the road surface 2 on which the vehicle 1 is traveling.

In a case where the vehicle 1 is traveling on the road surface 2 descending rightward as in FIG. 2, the right rollover angle that causes the rollover of the vehicle 1 to the right side may be smaller than a right rollover angle in a case where the vehicle 1 is traveling on the road surface 2 that is horizontal as in FIG. 1.

Similarly, in a case where the vehicle 1 is traveling on the road surface 2 descending leftward, the left rollover angle that causes the rollover of the vehicle 1 to the left side may be smaller than a left rollover angle in the case where the vehicle 1 is traveling on the road surface 2 that is horizontal as in FIG. 1.

Thus, a situation in which the vehicle 1 actually turns over varies depending on various factors including, without limitation, an inclination, in a left-right direction, of the road surface 2 on which the vehicle 1 is traveling. Hereinafter, the inclination in the left-right direction is sometimes referred to as a "left-right inclination".

If a turn-over of the vehicle 1 is determined by comparing a roll angle detected on the basis of a vehicle body with a constant determination threshold although a rollover angle that actually causes a turn-over of the vehicle 1 varies depending on various factors as described above, it is difficult to favorably determine a turn-over that the vehicle 1 can actually undergo.

For example, in a case where a detected value in FIG. 2 is compared with a value of a right roll angle in FIG. 1 as a determination threshold, it is difficult to determine a turn-over of the vehicle 1 in a situation in which the vehicle 1 actually turns over.

Other than this, for example, in a case where the detected value in FIG. 2 is compared with a value of a left roll angle in FIG. 1 as the determination threshold, it may be determined that the vehicle 1 is to turn over in a situation in which the vehicle 1 does not actually turn over. In such a case, the turn-over determination may be excessive.

Accordingly, it may be desired to favorably determine various turn-overs that the vehicle 1 can undergo without the determination being insufficient or excessive.

Figure 3:
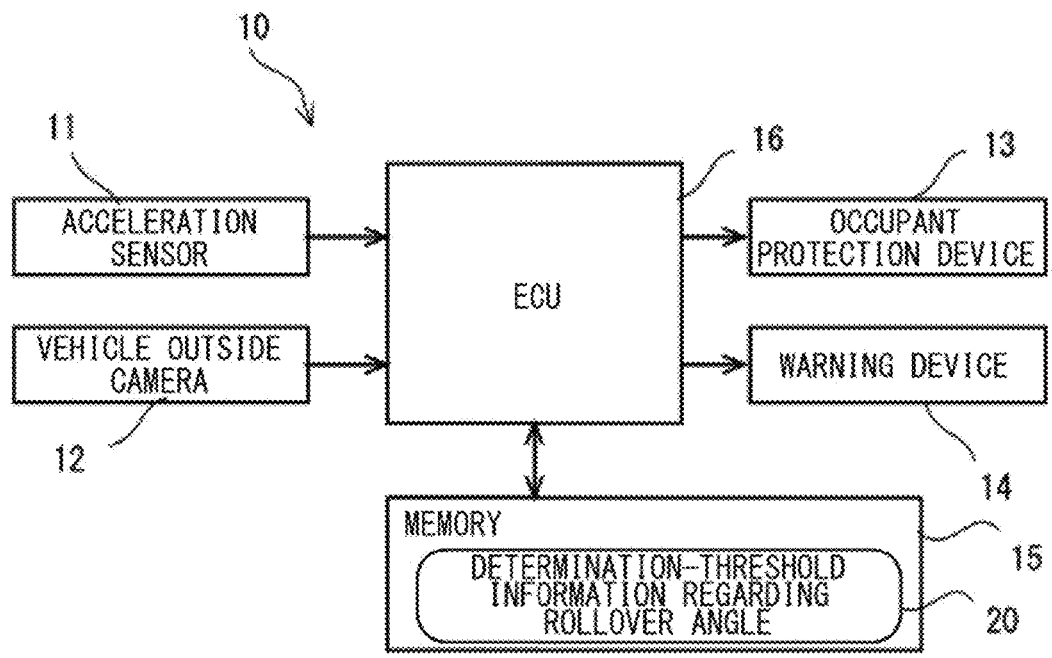
FIG. 3 is an explanatory diagram for describing a control system serving as a vehicle turn-over determination apparatus to be mounted on the vehicle illustrated in FIG. 1.

FIG. 3 is an explanatory diagram for describing a control system 10 to be provided on the vehicle 1 illustrated in FIG. 1.

The control system 10 illustrated in FIG. 3 to be provided on the vehicle 1 may include an acceleration sensor 11, a vehicle outside camera 12, an occupant protection device 13, a warning device 14, a memory 15, and an electronic control unit (ECU) 16. The acceleration sensor 11, the vehicle outside camera 12, the occupant protection device 13, the warning device 14, and the memory 15 may be coupled to the ECU 16. In one embodiment, the acceleration sensor 11, the vehicle outside camera 12, the memory 15, and the ECU 16 may serve as a "vehicle turn-over determination apparatus". In one embodiment, the occupant protection device 13 and the warning device 14 may serve as an "onboard device".

The acceleration sensor 11 may detect accelerations in three axial directions: an acceleration in a front-rear direction of the vehicle 1, an acceleration in a left-right direction of the vehicle 1; and an acceleration in an upper-lower direction of the vehicle 1.

In one example, the acceleration sensor 11 may generate, as detected values, a roll velocity, a pitch velocity, and a yaw rate of the vehicle 1 on the basis of the detected accelerations in the three axial directions.

In addition, the acceleration sensor 11 may generate, as a detected value, a roll angle of the vehicle 1 by time-integrating the generated roll velocity. The acceleration sensor 11 may generate, as a detected value, a pitch angle of the vehicle 1 by time-integrating the generated pitch velocity. The acceleration sensor 11 may generate, as a detected value, a yaw angle of the vehicle 1 by time-integrating the generated yaw rate.

The acceleration sensor 11 described above may be able to detect a value related to a current turn-over angle or a current roll velocity of the vehicle 1. In one embodiment, the acceleration sensor 11 may serve as a "turn-over sensor".

The vehicle outside camera 12 may be provided on the vehicle 1, for example, in a vehicle compartment, being directed toward an outside. In one example, vehicle outside cameras 12 may be provided on the vehicle 1, corresponding to the front, the rear, the left, and the right of the vehicle 1. In another example, the vehicle 1 may be provided with a vehicle outside camera that is able to capture a 360-degree image.

The vehicle outside camera 12 may capture an image including the road surface 2 that is present in the traveling direction of the vehicle 1. In one embodiment, the vehicle outside camera 12 may serve as a "road-surface detector".

In one example, the vehicle outside camera 12, serving as the "road-surface detector" in one embodiment, may detect the inclination of the road surface 2 that is present in the traveling direction of the vehicle 1 on the basis of a feature point of the road surface 2 in the captured image. In this case, the inclination of the road surface 2 that is present in the traveling direction of the vehicle 1 may be an inclination of the road surface 2 as a whole, or may be a roughness-caused inclination of the road surface 2 in a range within which the vehicle 1 travels. Examples of the feature point of the road surface 2 to be used in detecting the inclination of the road surface 2 may include a lane line drawn on the road surface 2.

Note that, other than the image captured by the vehicle outside camera 12, information regarding the road surface 2 that is present in the traveling direction of the vehicle 1 may include, for example, information regarding a shape or roughness of the road surface 2 obtained by a light detection and ranging (Lidar). For example, the Lidar may output a high-frequency signal around the vehicle 1 and detect a distance to a tangible object in an output direction of the high-frequency signal on the basis of reflection of the outputted high-frequency signal. The Lidar may be able to detect a shape of an object outside the vehicle 1, including the road surface 2, by varying the output direction of the high-frequency signal.

The occupant protection device 13 may be configured to protect an occupant present in the vehicle 1. The occupant protection device 13 may be a device such as a seat belt device or an air bag device. The seat belt device may help to prevent a seat belt from being pulled out in accordance with an action signal, for example, based on contact detection. This may make the seat belt support a body of an occupant sitting on a seat of the vehicle 1, thereby preventing the body from easily moving away from the seat. The air bag device may deploy an air bag around the body of the occupant sitting on the seat of the vehicle 1 in accordance with an action signal, for example, based on the contact detection. This may make, for example, the deployed air bag support an upper body of the occupant which begins to incline. The above-described occupant protection controls make it possible to absorb and reduce an impact on the occupant.

The warning device 14 may output a warning, for example, for the occupant present in the vehicle 1. In one example, the warning device 14 may output the warning by a sound, by light, or in any other way. Such a warning allows a person such as the occupant to recognize that an emergency is occurring or is to occur.

The warning device 14, as well as the occupant protection device 13, may be mounted on the vehicle 1 to be operable upon the turn-over of the vehicle 1.

The memory 15 may be, for example but not limited to, a semiconductor memory or a hard disk drive (HDD). Examples of the semiconductor memory may include a solid state drive (SSD) and a random-access memory (RAM). The memory 15 may hold a program and also hold, as data, various kinds of information to be used in a control based on the program. In the example described here, the memory 15 may hold determination-threshold information 20 regarding a rollover angle.

The ECU 16 may be a microcomputer. The ECU 16 may execute the program held in the memory 15. In one embodiment, the ECU 16 may serve as a "determination processor".

In one example, the ECU 16, which may serve as the "determination processor" in one embodiment, may determine a turn-over such as a rollover of the vehicle 1 on the basis of the detected value obtained by the acceleration sensor 11 and the determination-threshold information 20 held in the memory 15.

In one example, the ECU 16, which may serve as the "determination processor" in one embodiment, may output the respective action signals to the occupant protection device 13 and the warning device 14 in a case where the turn-over such as the rollover of the vehicle 1 is determined.

Figure 4:
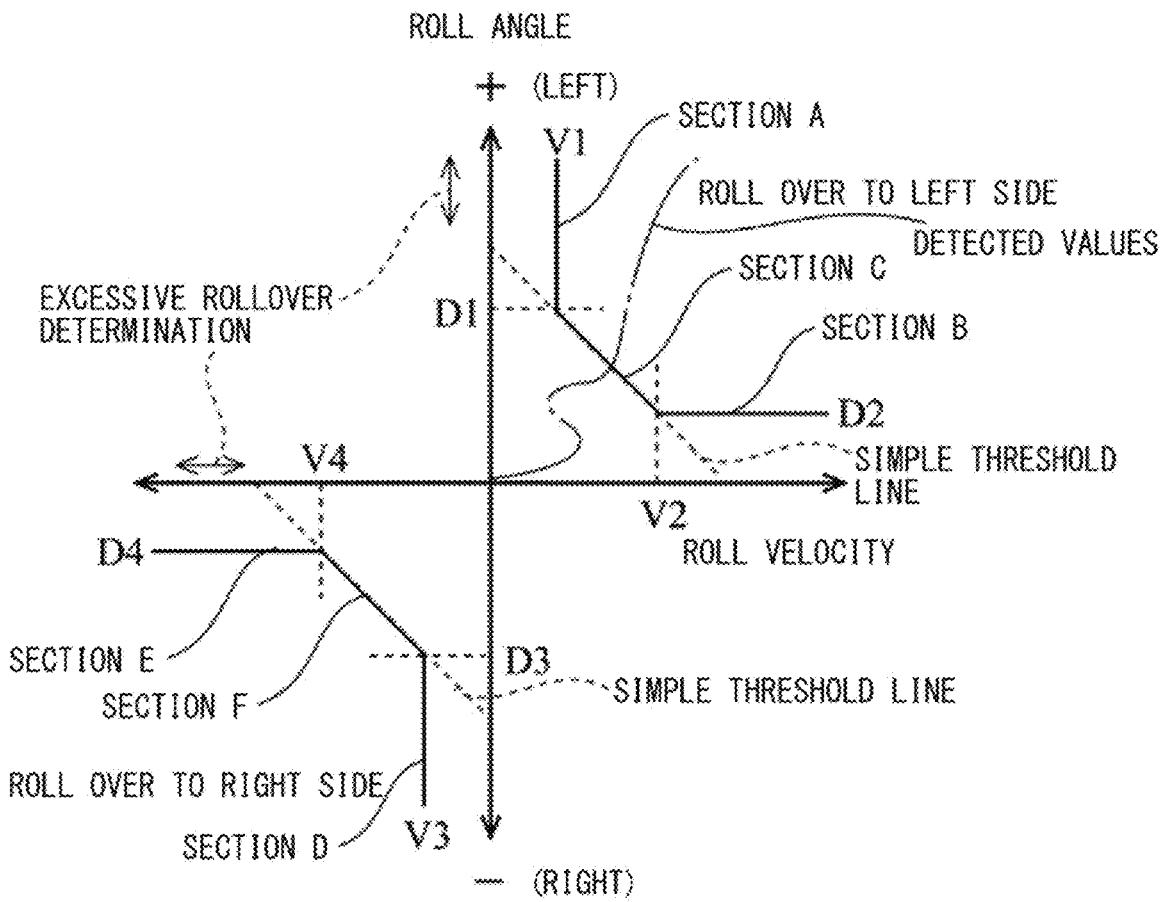
FIG. 4 is an explanatory diagram for describing sets of determination threshold each including a determination threshold related to a roll angle and a determination threshold related to a roll velocity.

FIG. 4 is an explanatory diagram for describing sets of determination threshold regarding a rollover each including a determination threshold related to a roll angle and a determination threshold related to a roll velocity.

In FIG. 4, a horizontal axis represents a roll velocity, and a vertical axis represents a roll angle. The origin indicates a non-rolling state of the vehicle 1.

Regarding detection of the roll angle, a roll angle in the left direction with respect to an upper direction of the vehicle 1 may be detected as a positive value (+), and a roll angle in the right direction with respect to the upper direction of the vehicle 1 may be detected as a negative value (−).

It is possible to assume that the upper direction of the vehicle 1 is along a direction of a normal vertical to the road surface 2.

As indicated in the explanatory diagram of FIG. 4, a determination threshold usable in a rollover determination for the vehicle 1 in the example embodiment may be set on the basis of a determination curve for left side and a determination curve for right side. The determination curve for left side may include a line segment in section A, a line segment in section B, and a line segment in section C. The determination curve for right side may include a line segment in section D, a line segment in section E, and a line segment in section F.

In a case where a combination of a roll angle and a roll velocity in a region above the determination curve for left side is detected, the vehicle 1 may roll over to the left side. The determination curve for left side is the one at the upper-right in FIG. 4.

In a case where a combination of a roll angle and a roll velocity in a region below the determination curve for right side is detected, the vehicle 1 may roll over to the right side. The determination curve for right side is the one at the lower-left in FIG. 4.

In a case where a combination of a roll angle and a roll velocity in a region between the determination curve for left side and the determination curve for right side is detected, the vehicle 1 may not roll over. The region between the determination curve for left side and the determination curve for right side is a region that includes the origin.

In the rollover determination, it may be desired to appropriately determine whether the vehicle 1 actually undergoes such a roll over, without the determination being insufficient or excessive.

Note that the determination curve for left side and the determination curve for right side illustrated in FIG. 4 may be symmetrical about the origin. The determination curve for left side and the determination curve for right side illustrated in FIG. 4 may correspond, for example, to a case where the vehicle 1 is traveling on the road surface 2 that is horizontal.

As the threshold to be used in the rollover determination, it may be possible to use a threshold based on simple threshold lines indicated by dashed lines in FIG. 4. The simple threshold lines may intersect with the vertical line representing a roll angle and the horizontal line representing a roll velocity.

In a case where the rollover determination is performed using the threshold based on such simple threshold lines, for example, even if the roll velocity of the vehicle 1 becomes zero and the roll angle does not increase anymore, it can be determined that the vehicle 1 is to roll over only on the basis of the information that the roll angle has exceeded the threshold.

As another example, if an excessively great roll velocity is detected while the vehicle 1 is not rolling at all (i.e., when the roll angle is zero), it can be determined that the vehicle 1 is to roll over only on the basis of the information that the roll velocity has exceeded the threshold.

Thus, there still is room for improvement in the rollover determination using the threshold based on the simple threshold lines in order to achieve a favorable determination as to whether the vehicle 1 actually undergoes a rollover.

For the above-described reasons, in the example embodiment, the following may be used: determination thresholds based on the determination curve for left side which includes the line segment in section A, the line segment in section B, and the line segment in section C; and determination thresholds based on the determination curve for right side which includes the line segment in section D, the line segment in section E, and the line segment in section F.

The line segment in section A included in the determination curve for left side may represent combinations of determination thresholds in each of which the roll angle is D1 or greater and the roll velocity is V1.

The line segment in section B may represent combinations of determination thresholds in each of which the roll angle is D2 and the roll velocity is V2 or greater.

The line segment in section C may connect the line segment in section A and the line segment in section B with each other. The line segment in section C may be on a portion of the simple threshold line.

The line segment in section C and the line segment in section A may be joined to each other at a point indicating the roll angle of D1 and the roll velocity of V1.

The line segment in section C and the line segment in section B may be joined to each other at a point indicating the roll angle of D2 and the roll velocity of V2.

The line segment in section D included in the determination curve for right side may represent combinations of determination thresholds in each of which the roll angle is D3 or greater and the roll velocity is V3.

The line segment in section E may represent combinations of determination thresholds in each of which the roll angle is D4 and the roll velocity is V4 or greater.

The line segment in section F may connect the line segment in section D and the line segment in section E with each other. The line segment in section F may be on a portion of the simple threshold line.

The line segment in section F and the line segment in section D may be joined to each other at a point indicating the roll angle of D3 and the roll velocity of V3.

The line segment in section F and the line segment in section E may be joined to each other at a point indicating the roll angle of D4 and the roll velocity of V4.

Such a determination using the thresholds based on the above-described determination curves may help to avoid the determination performed in the case of using the thresholds based on the above-described simple threshold lines.

For example, in the case where the roll velocity of the vehicle 1 becomes zero and the roll angle does not increase anymore, it is possible to determine that the vehicle 1 is not to roll over even if the absolute value of the roll angle becomes greater than D1 or D3.

In addition, for example, even if an excessively great roll velocity having the absolute value exceeding V2 or V4 is detected while the vehicle 1 is not rolling at all (i.e., when the roll angle is zero), it is possible to determine that the vehicle 1 is not to roll over.

FIG. 5 is an explanatory diagram for describing sets of determination-threshold information 20 regarding a rollover recorded in the memory 15 illustrated in FIG. 3 and for describing a determination procedure based on the sets of the determination-threshold information 20.

As described in FIG. 5, sets of determination thresholds related to a rollover may be recorded in the memory 15. In an example described here, the following may be recorded in the memory 15: a combination of a determination threshold D1 related to a roll angle and a determination threshold V1 related to a roll velocity; and a combination of a determination threshold D2 related to a roll angle and a determination threshold V2 related to a roll velocity. The following may be also recorded in the memory 15: a combination of a determination threshold D3 related to a roll angle and a determination threshold V3 related to a roll velocity; and a combination of a determination threshold D4 related to a roll angle and a determination threshold V4 related to a roll velocity.

In addition, recorded in the memory 15 may be sets of determination thresholds in each of which the combination of the determination threshold related to a roll angle and the determination threshold related to a roll velocity is positioned on the inclined line segment in section C. In addition, recorded in the memory 15 may be sets of determination thresholds in each of which the combination of the determination threshold related to a roll angle and the determination threshold related to a roll velocity is positioned on the inclined line segment in section F.

Thus, the memory 15 may hold, as the determination-threshold information 20, determination-threshold information 20 regarding a turn-over of the vehicle 1 in the right direction and determination-threshold information 20 regarding a turn-over of the vehicle 1 in the left direction.

In addition, the memory 15 may hold, as the determination-threshold information 20, sets of the determination-threshold information 20 each including a combination of a determination threshold related to a roll angle and a determination threshold related to a roll velocity that causes the vehicle 1 to roll over.

The ECU 16, which may serve as the "determination processor" in one embodiment, may use the sets of determination-threshold information 20 recorded in the memory 15 to determine a rollover of the vehicle 1 independently of the inclination of the road surface 2.

The first to third rows in FIG. 5 describe determination contents and a determination procedure for determining a rollover in a case where the vehicle 1 is rolling in the left direction.

The determination procedure may be recorded in the memory 15 as data or may be described as a process of a program.

In a case where the vehicle 1 is rolling in the left direction, first, the ECU 16 may execute a process described in the first row in FIG. 5 to determine whether a detected value related to a roll angle is the determination threshold D1 or greater. If the detected value related to a roll angle is the determination threshold D1 or greater, the ECU 16 may further determine whether a detected value related to a roll velocity is the determination threshold V1 or greater. If the detected value related to a roll velocity is the determination threshold V1 or greater, the ECU 16 may determine that the vehicle 1 is to roll over to the left side. In such a manner, the ECU 16 may be able to determine whether the vehicle 1 is to roll over in a case where the detected value related to a roll angle is the determination threshold D1 or greater.

In a case of not determining that the vehicle 1 is to roll over in the process described in the first row in FIG. 5, the ECU 16 may thereafter execute a process described in the second row in FIG. 5 to determine whether the detected value related to a roll velocity is the determination threshold V2 or greater. If the detected value related to a roll velocity is the determination threshold V2 or greater, the ECU 16 may further determine whether the detected value related to a roll angle is the determination threshold D2 or greater. If the detected value related to a roll angle is the determination threshold D2 or greater, the ECU 16 may determine that the vehicle 1 is to roll over to the left side. In such a manner, the ECU 16 may be able to determine whether the vehicle 1 is to roll over in a case where the detected value related to a roll velocity is the determination threshold V2 or greater.

In a case of not determining that the vehicle 1 is to roll over in the process described in the second row in FIG. 5, the ECU 16 may thereafter execute a process described in the third row in FIG. 5. The ECU 16 may determine whether the combination of the detected value related to a roll velocity and the detected value related to a roll angle is greater than or equal to the combination of the roll velocity and the roll angle on the threshold line in section C. If the combination greater than or equal to the combination on the threshold line in section C is detected, the ECU 16 may determine that the vehicle 1 is to roll over to the left side. With the threshold determination in the first to third rows in FIG. 5 described above, the ECU 16 is able to determine whether the vehicle 1 is to roll over to the left side.

The fourth to sixth rows in FIG. 5 describe determination contents and a determination procedure for determining a rollover in a case where the vehicle 1 is rolling in the right direction. The determination procedure may be recorded in the memory 15 as data or may be described as a process of a program.

In a case where the vehicle 1 is rolling in the right direction, first, the ECU 16 may execute a process described in the fourth row in FIG. 5. The ECU 16 may determine whether the absolute value of the detected value related to a roll angle is the determination threshold D3 or greater. If the absolute value of the detected value related to a roll angle is the determination threshold D3 or greater, the ECU 16 may further determine whether the absolute value of the detected value related to a roll velocity is the determination threshold V3 or greater. If the absolute value of the detected value related to a roll velocity is the determination threshold V3 or greater, the ECU 16 may determine that the vehicle 1 is to roll over to the right side. In such a manner, the ECU 16 is able to determine whether the vehicle 1 is to roll over in a case where the absolute value of the detected value related to a roll angle is the determination threshold D3 or greater.

In a case of not determining that the vehicle 1 is to roll over in the process described in the fourth row in FIG. 5, the ECU 16 may thereafter execute a process described in the fifth row in FIG. 5. The ECU 16 may determine whether the absolute value of the detected value related to a roll velocity is the determination threshold V4 or greater. If the absolute value of the detected value related to a roll velocity is the determination threshold V4 or greater, the ECU 16 may further determine whether the absolute value of the detected value related to a roll angle is the determination threshold D4 or greater. If the absolute value of the detected value related to a roll angle is the determination threshold D4 or greater, the ECU 16 may determine that the vehicle 1 is to roll over to the right side. In such a manner, the ECU 16 is able to determine whether the vehicle 1 is to roll over in a case where the absolute value of the detected value related to a roll velocity is the determination threshold V4 or greater.

In a case of not determining that the vehicle 1 is to roll over in the process described in the fifth row in FIG. 5, the ECU 16 may thereafter execute a process described in the sixth row in FIG. 5. The ECU 16 may determine whether the combination of the absolute value of the detected value related to a roll velocity and the absolute value of the detected value related to a roll angle is greater than or equal to the combination of the absolute value of the roll velocity and the absolute value of the roll angle on the threshold line in section F. If the combination greater than or equal to the combination on the threshold line in section F is detected, the ECU 16 may determine that the vehicle 1 is to roll over to the right side. With the threshold determination in the fourth to sixth rows in FIG. 5 described above, the ECU 16 is able to determine whether the vehicle 1 is to roll over to the right side.

Figure 6:
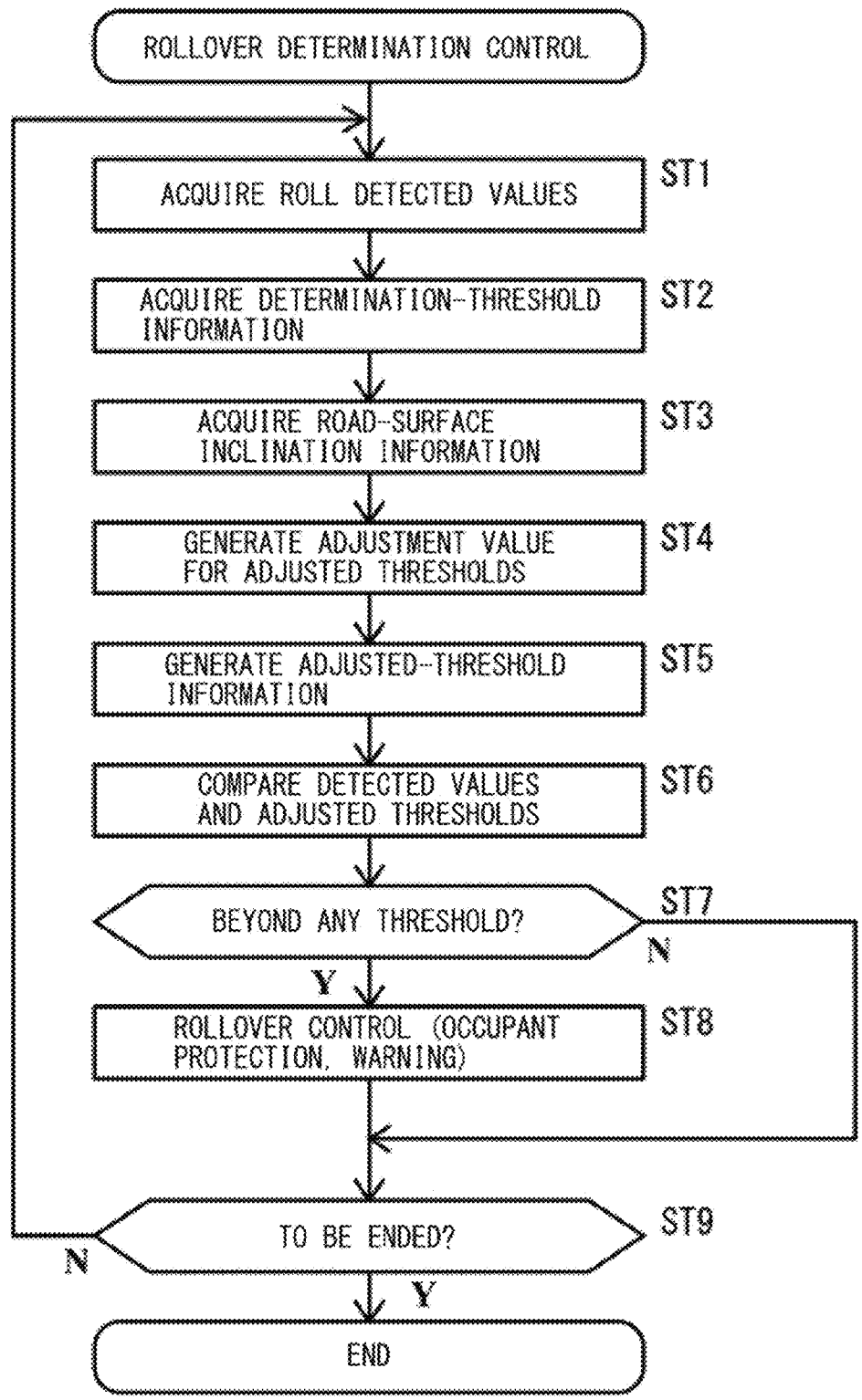
FIG. 6 is a flowchart for describing a flow of a rollover determination control for a vehicle to be executed by an ECU illustrated in FIG. 3.

FIG. 6 is a flowchart describing a flow of a rollover determination control for the vehicle 1.

The ECU 16 for the vehicle 1 illustrated in FIG. 2, which may serve as the "determination processor" in one embodiment, may repeatedly execute the rollover determination control described in FIG. 6 every time the vehicle 1 travels, for example.

In step ST1, the ECU 16 may acquire a roll velocity and a roll angle as detected values related to a roll of the vehicle 1 in the left-right direction.

Note that, for example, in a case where the acceleration sensor 11 has detected only the roll velocity, the ECU 16 may integrate the roll velocities continuously acquired from the acceleration sensor 11 to thereby acquire the roll angle.

While traveling, the vehicle 1 may sometimes be inclined in the right direction and sometimes be inclined in the left direction. If such an inclination of the vehicle 1 in the left-right direction increases, the vehicle 1 may roll over.

In step ST2, to determine a rollover of the vehicle 1, the ECU 16 may read and acquire from the memory 15 the sets of determination-threshold information 20 each including the combination of the determination threshold related to a roll angle and the determination threshold related to a roll velocity described in reference to FIG. 5. As described in FIG. 4, the sets of determination-threshold information 20 to be acquired here may be the sets of determination-threshold information 20 in a case where the road surface 2 is substantially horizontal, for example.

In step ST3, the ECU 16 may acquire from the vehicle outside camera 12 information regarding the inclination of the road surface 2 that is present in the traveling direction of the vehicle 1. The road surface 2 on which the vehicle 1 travels is not always horizontal, and sometimes descends rightward or leftward. The vehicle outside camera 12 may detect the inclination of the road surface 2 that is present in the traveling direction of the vehicle 1 on the basis of the image captured by the vehicle outside camera 12. Note that, in one example, the ECU 16 may acquire the information regarding the inclination of the road surface 2 that is present in the traveling direction of the vehicle 1 by acquiring the captured image from the vehicle outside camera 12 and determining the inclination of the road surface 2 that is present in the traveling direction of the vehicle 1.

In step ST4, the ECU 16 may generate an adjustment value to be used in generating an adjusted threshold. The adjusted threshold may be obtained by varying the determination threshold in accordance with the acquired inclination of the road surface 2. The ECU 16 may generate a greater adjustment value in accordance with an increase in the left-right inclination of the road surface 2 that is present in the traveling direction of the vehicle 1 and detected by the vehicle outside camera 12. In one example, the ECU 16 may set, to the adjustment value, an inclination angle of the road surface 2 with respect to a horizontal plane. In a case where the road surface 2 descends leftward, the ECU 16 may generate a negative adjustment value by attaching a minus sign to the absolute value of the inclination angle. In a case where the road surface 2 descends rightward, the ECU 16 may generate a positive adjustment value by attaching a plus sign to the absolute value of the inclination angle.

In step ST5, the ECU 16 may generate adjusted-threshold information to be used in an actual comparison-based determination on the basis of the determination-threshold information acquired from the memory 15 and the adjustment value.

In one example, the ECU 16 may add the adjustment value generated in accordance with the inclination of the road surface 2 to each of the determination thresholds related to a roll angle acquired from the memory 15, to thereby generate each adjusted threshold related to a roll angle. In this case, each of the adjusted thresholds corresponding to the roll angles of D1 to D4 in FIG. may be a value obtained by adding the adjustment value to the value of corresponding one of D1 to D4.

In addition, the ECU 16 may add the adjustment value generated in accordance with the inclination of the road surface 2 to each of the determination thresholds related to a roll velocity acquired from the memory 15, to thereby generate each adjusted threshold related to a roll velocity. In this case, each of the adjusted thresholds corresponding to the roll velocities of V1 to V4 in FIG. 5 may be a value obtained by adding the adjustment value to the value of corresponding one of V1 to V4.

In such a manner, the ECU 16 may generate the adjusted thresholds related to a roll angle corresponding to all of the determination thresholds related to a roll angle acquired from the memory 15. The ECU 16 may also generate the adjusted thresholds related to a roll velocity corresponding to all of the determination thresholds related to a roll velocity acquired from the memory 15. The ECU 16 may be able to generate the adjusted-threshold information adjusted in accordance with the inclination of the road surface 2 by varying the determination-threshold information 20 acquired from the memory 15 in accordance with the left-right inclination of the road surface 2 that is present in the traveling direction of the vehicle 1 and detected by the vehicle outside camera 12.

In step ST6, the ECU 16 may compare the current detected value related to a roll angle and the current detected value related to a roll velocity acquired from the acceleration sensor 11 with the generated adjusted threshold related to a roll angle and the generated adjusted threshold related to a roll velocity.

In this case, basically, the ECU 16 may compare the detected value related to a roll angle and the detected value related to a roll velocity with each of the sets of adjusted threshold each including a combination of the roll angle and the roll velocity adjusted in accordance with the left-right inclination of the road surface 2 that is present in the traveling direction of the vehicle 1.

Other than the above, for example, in a case where the vehicle 1 is rolling in the left direction, the ECU 16 may execute the above-described processes in the first to third rows in FIG. with replacing the determination thresholds with the adjusted thresholds. In a case where the vehicle 1 is rolling in the right direction, the ECU 16 may execute the above-described processes in the fourth to sixth rows in FIG. 5 with replacing the determination thresholds with the adjusted thresholds. In such a manner, the ECU 16 is able to determine whether the vehicle 1 is to roll over in the left side or in the right side.

Further, with the above-described processes, the ECU 16 is able to predictably determine a rollover possibility in a case of assuming that the vehicle 1 maintains the current inclination and travels ahead on the road surface 2 that is present in the traveling direction.

In step ST7, the ECU 16 may determine whether the combination of the detected roll angle and the detected roll velocity is beyond any of the combinations of adjusted thresholds.

If the combination of the detected values is beyond any of the combinations of adjusted thresholds (step ST7: Y), the ECU 16 may proceed the process to step ST8.

In contrast, if the combination of the detected values is not beyond any of the combinations of adjusted thresholds (step ST7: N), the ECU 16 may proceed the process not to step ST8 but to step ST9.

In step ST8, the ECU 16 may execute a rollover control for a case where the vehicle 1 is to roll over.

The ECU 16 may supply a start signal, for example, to each of the occupant protection device 13 and the warning device 14.

Upon receiving the start signal based on a rollover prediction, the occupant protection device 13 may start a control for protecting an occupant.

Upon receiving the start signal based on the rollover prediction, the warning device 14 may output a warning for a person such as an occupant by a sound, by light, or in any other way.

In step ST9, the ECU 16 may determine whether the rollover determination control described in FIG. 6 is to be ended.

For example, in a case where the vehicle 1 is stopped and an unillustrated engine start button is operated, the ECU 16 may determine that the rollover determination control is to be ended. In this case (step ST9: Y), the ECU 16 may end the rollover determination control described in FIG. 6.

If it is not determined that the rollover determination control is to be ended (step ST9: N), the ECU 16 may return the process to step ST1. The ECU 16 may repeat the respective processes in steps ST1 to ST9 until the ECU 16 determines that the rollover determination control is to be ended.

In such a manner, the ECU 16 is able to predictably determine whether the vehicle 1 is to rollover substantially constantly, for example, while the vehicle 1 is traveling. In addition, upon determining that the vehicle 1 is to actually roll over, the ECU 16 is able to cause the onboard device to execute an operation addressed for the rollover.

Figure 7:
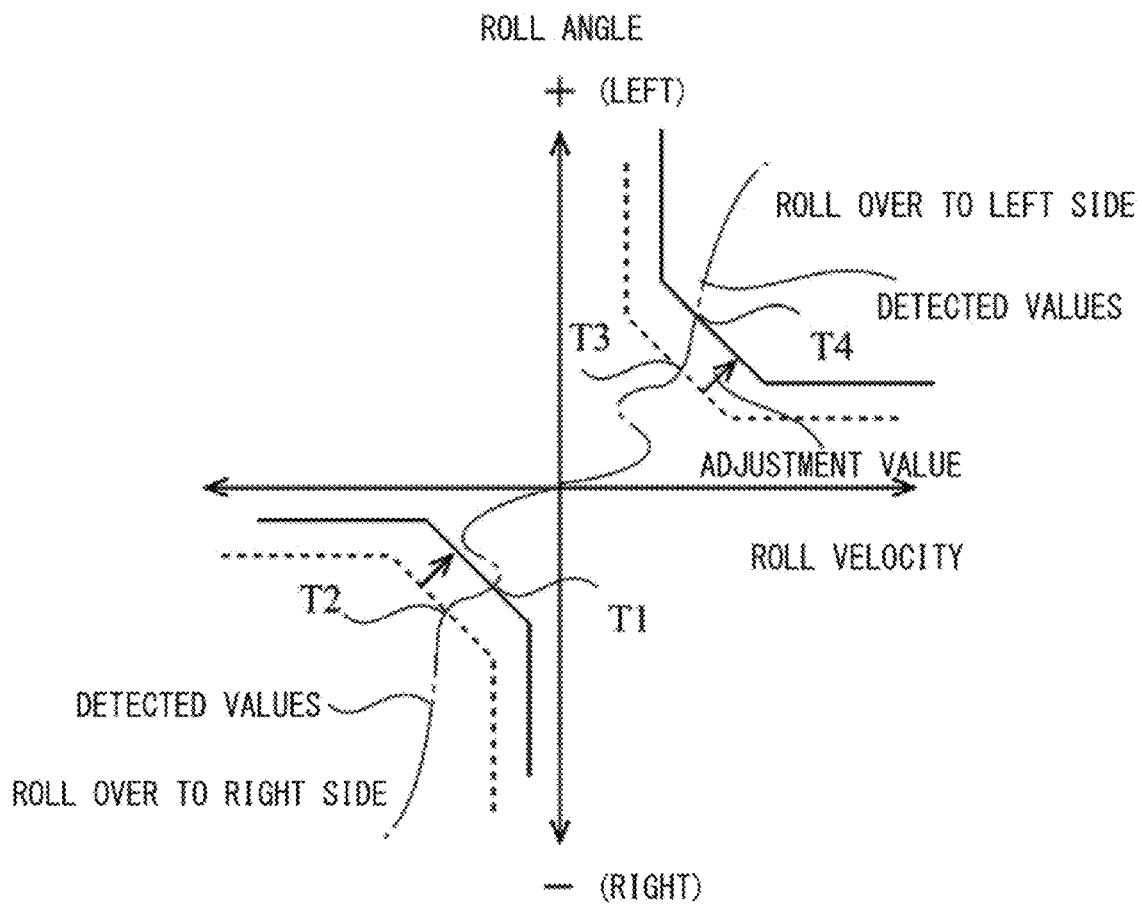
FIG. 7 is a diagram for describing a threshold information adjustment process in a case of the road surface that descends rightward.

FIG. 7 is a diagram for describing a threshold information adjustment process in a case of the road surface 2 that descends rightward. The vertical axis and the horizontal axis in FIG. 7 represent parameters similar to those in FIG. 4.

Dashed lines in FIG. 7 indicate the determination curve for left side and the determination curve for right side that are recorded in the memory 15 and illustrated in FIG. 4.

In the respective processes in steps ST3 to ST5 described in FIG. 6, the ECU 16 may adjust the determination curves by the adjustment value based on the inclination of the road surface 2, and thereby generate adjusted curves indicated by solid lines in FIG. 7.

FIG. 7 describes a generation process in a case where the road surface 2 descends rightward.

In this case, the ECU 16 may move the determination curve for right side, which is positioned at the lower-left in FIG. 7, in an upper-right direction by the adjustment value. The absolute value of the adjusted threshold related to a turn-over in the right direction may thus be smaller than the absolute value of the determination threshold.

In addition, the ECU 16 may move the determination curve for left side, which is positioned at the upper-right in FIG. 7, in an upper-right direction by the adjustment value. The absolute value of the adjusted threshold related to a turn-over in the left direction may thus be greater than the absolute value of the determination threshold.

Figure 8:
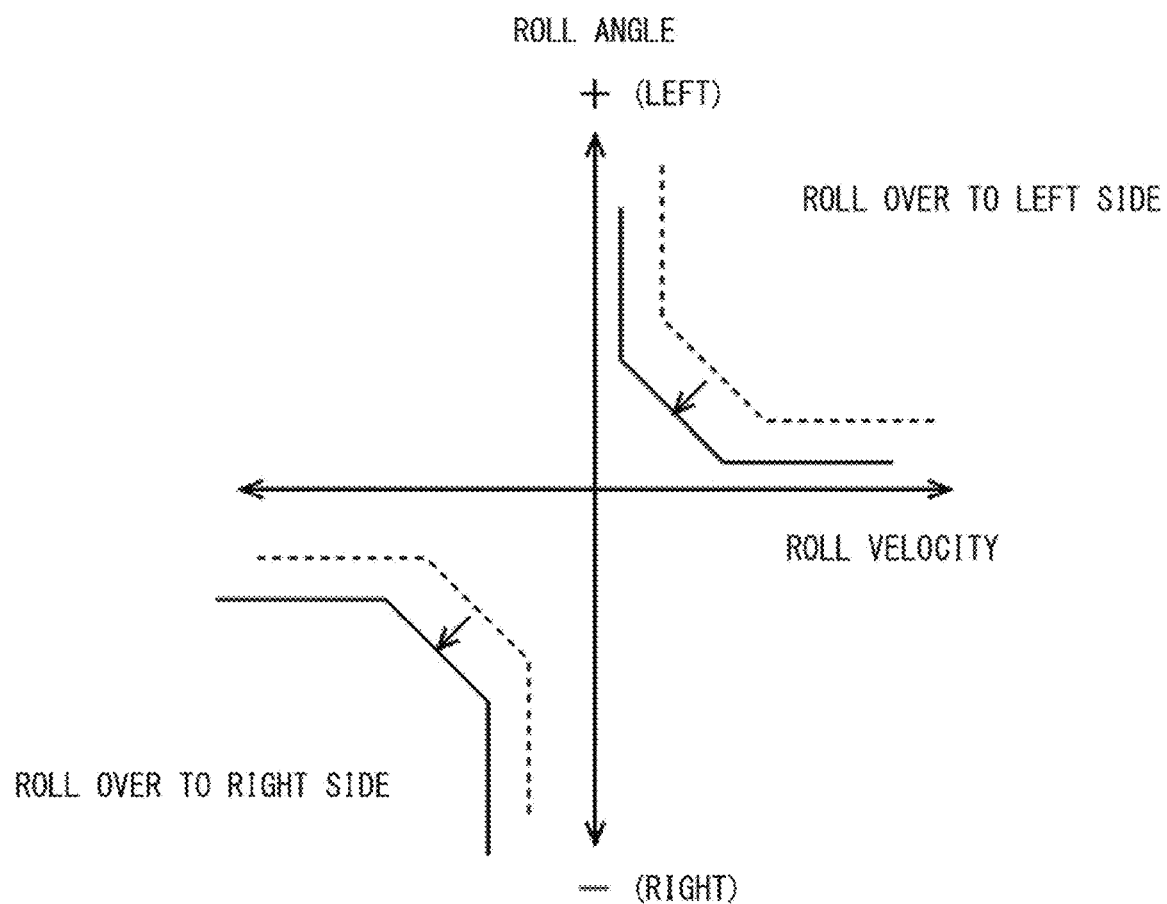
FIG. 8 is a diagram for describing a threshold information adjustment process in a case of a road surface that descends leftward.

FIG. 8 is a diagram for describing a threshold information adjustment process in a case of the road surface 2 that descends leftward. The vertical axis and the horizontal axis in FIG. 8 represent parameters similar to those in FIG. 4.

Dashed lines in FIG. 8 represent the determination curve for left side and the determination curve for right side that are recorded in the memory 15 and illustrated in FIG. 4.

In the respective processes in steps ST3 to ST5 described in FIG. 6, the ECU 16 may adjust the determination curves by the adjustment value based on the inclination of the road surface 2, and thereby generate adjusted curves indicated by solid lines in FIG. 8.

FIG. 8 describes a generation process in a case where the road surface 2 descends leftward.

In this case, the ECU 16 may move the determination curve for right side, which is positioned at the lower-left in FIG. 8, in a lower-left direction by the adjustment value. The absolute value of the adjusted threshold related to a turn-over in the right direction may thus be greater than the absolute value of the determination threshold.

In addition, the ECU 16 may move the determination curve for left side, which is positioned at the upper-right in FIG. 8, in a lower-left direction by the adjustment value. The absolute value of the adjusted threshold related to a turn-over in the left direction may thus be smaller than the absolute value of the determination threshold.

As described above, for example, the memory 15 may hold the determination-threshold information 20 regarding a rollover on the road surface 2 of a single inclination, for example, the road surface 2 which is horizontal.

On the basis of the determination-threshold information 20 recorded in the memory 15, the ECU 16 may generate the adjusted-threshold information corresponding to the inclination of the road surface 2 that is present in the traveling direction, and compare the generated adjusted-threshold information with the detected values.

For example, as indicated by a dash-dot-dash line at the upper-right of FIG. 7, a detected value related to a roll angle indicating a turn-over of the vehicle 1 to the left side may sometimes be continuously detected on the road surface 2 that descends rightward. In such a case, the ECU 16 may refrain from determining that the vehicle 1 is to roll over to the left side until the detected values become the combination of the roll angle and the roll velocity greater than that in the case of the road surface 2 which is horizontal.

A timing T4 at which it is determined that the vehicle 1 is to roll over to the left side on the road surface 2 descending rightward may be later than a timing T3 at which a similar determination is made on the road surface 2 which is horizontal. The roll angle in the left side in the case of determining the rollover to the left side on the road surface 2 descending rightward may be greater than that in the case of determining the rollover to the left side on the road surface 2 which is horizontal.

For example, as indicated by a dash-dot-dash line at the lower-left of FIG. 7, a detected value related to a roll angle indicating a turn-over of the vehicle 1 to the right side may sometimes be continuously detected on the road surface 2 descending rightward. In such a case, the ECU 16 may determine that the vehicle 1 is to roll over to the right side in a case where the detected values are the combination of the roll angle and the roll velocity smaller than that in the case of the road surface 2 which is horizontal.

A timing T1 at which it is determined that the vehicle 1 is to roll over to the right side on the road surface 2 descending rightward may be earlier than a timing T2 at which a similar determination is made on the road surface 2 which is horizontal. The roll angle in the right side in the case of determining the rollover to the right side on the road surface 2 descending rightward may be smaller than that in the case of determining the rollover to the right side on the road surface 2 which is horizontal.

As described above, in the example embodiment, the determination-threshold information 20 acquired from the memory 15 may not be used as it is in performing a comparison with the detected values obtained by the acceleration sensor 11. In the example embodiment, the determination-threshold information 20 may be varied in accordance with the left-right inclination of the road surface 2 that is present in the traveling direction of the vehicle 1 and detected by the vehicle outside camera 12, to thereby generate adjusted-threshold information adjusted in accordance with the inclination of the road surface 2. In such a case, the adjusted threshold information may be generated by varying more greatly the determination-threshold information 20 acquired from the memory 15 in accordance with an increase in the left-right inclination of the road surface 2 that is present in the traveling direction of the vehicle 1 and detected by the vehicle outside camera 12. In the example embodiment, the adjusted-threshold information generated by the adjustment may be compared with the detected values obtained by the acceleration sensor 11. In the example embodiment, it is possible to perform a determination for various possible inclinations of the road surface 2 by performing such a determination based on a comparison between the detected value and the threshold. Further, in the example embodiment, it is possible to perform the determination collectively for the various possible inclinations of the road surface 2. In the example embodiment, it is possible to perform the determination in a shorter time without performing the comparison-based determination multiple times for the respective possible inclinations of the road surface 2.

Thus, in the example embodiment, it is possible to predictably determine the turn-over of the vehicle 1, for example, before the vehicle outside camera 12 detects a turn-over angle at which the vehicle 1 actually turns upside down. The vehicle 1 is thus able to start controlling the vehicle 1 on the basis of such a predicted determination of the turn-over before the vehicle 1 actually turns over. On the basis of such a predicted determination of the turn-over, the onboard device such as the occupant protection device 13 may start operating. The vehicle 1 according to the example embodiment is thus possible to cause the onboard device such as an occupant protection device to start operating for the vehicle that is to turn over.

In addition, in the example embodiment, the memory 15 may hold the determination-threshold information 20 regarding a single inclination of the road surface 2 (for example, the inclination of the road surface 2 which is horizontal). The ECU 16, which may serve as the "determination processor" in one embodiment, is able to execute a comparison-based determination for various inclinations of the road surface 2 by executing only a certain comparison-based determination based on the determination-threshold information 20 regarding the single inclination of the road surface 2. For example, it may not be necessary to record in the memory 15 multiple pieces of determination-threshold information 20 for respective inclinations of the road surface 2. In addition, the ECU 16 may not need to execute a case-by-case determination process for each inclination of the road surface 2, for example.

As a result, in the example embodiment, it is possible to execute a reliable determination favorably adapted to a turn-over situation which varies depending on the inclination of the road surface 2. In the example embodiment, for example, it is possible to help to prevent an excessive turn-over determination in a situation that does not actually cause a turn-over, and to prevent a failure in a turn-over determination in a situation that actually causes a turn-over. In the example embodiment, it is possible to cause the onboard device such as the occupant protection device 13 to favorably operate if necessary, while suppressing an excessive operation of the onboard device such as the occupant protection device 13.

In the example embodiment, the memory 15 may hold, as the determination-threshold information 20, the determination-threshold information 20 regarding a turn-over of the vehicle 1 in the right direction and the determination-threshold information 20 regarding a turn-over of the vehicle 1 in the left direction.

In some cases, the vehicle outside camera 12 provided on the vehicle 1 may detect that the road surface 2 present in the traveling direction descends rightward. In the example embodiment, the determination-threshold information 20 may be varied to thereby decrease the absolute value of the determination threshold related to a turn-over in the right direction acquired from the memory 15 and increase the absolute value of the determination threshold related to a turn-over in the left-direction acquired from the memory 15. The adjusted-threshold information adjusted in accordance with the inclination of the road surface 2 may be thus generated.

In other cases, the vehicle outside camera 12 provided on the vehicle 1 may detect that the road surface 2 present in the traveling direction descends leftward. In the example embodiment, the determination-threshold information 20 may be varied to thereby increase the absolute value of the determination threshold related to a turn-over in the right direction acquired from the memory 15 and decrease the absolute value of the determination threshold related to a turn-over in the left-direction acquired from the memory 15. The adjusted-threshold information adjusted in accordance with the inclination of the road surface 2 may thus be generated.

In such a manner, the direction of the turn-over of the vehicle 1 may be divided into left and right. The determination threshold may be prepared for each of left and right, and thus prepared determination thresholds may be adjusted separately for left and right. This makes it possible to generate adjusted-threshold information for both left and right by a certain process procedure.

In the example embodiment, the sets of determination-threshold information 20 each including the determination threshold related to a roll angle and the determination threshold related to a roll velocity of the vehicle 1 may be recorded in the memory 15 as the determination-threshold information 20. In the example embodiment, the determination threshold related to a roll angle and the determination threshold related to a roll velocity included in each of the sets of determination-threshold information 20 acquired from the memory 15 may be varied in accordance with the inclination of the road surface 2 that is present in the traveling direction of the vehicle 1 and detected by the vehicle outside camera 12. Further, in the example embodiment, the sets of adjusted-threshold information each including the adjusted threshold related to a roll angle and the adjusted threshold related to a roll velocity that are adjusted in accordance with the inclination of the road surface 2 may be generated, and the generated sets of adjusted-threshold information may be compared with the detected value obtained by the acceleration sensor 11. Further, in the example embodiment, in a case where the detected values obtained by the acceleration sensor 11 are beyond any of the sets of adjusted-threshold information, it is possible to predictably determine that the vehicle 1 is to turn over.

In the example embodiment, it is thus possible to determine a turn-over on the basis of the relationship between the roll angle and the roll velocity of the vehicle 1, not only in accordance with the inclination of the road surface 2 but also in accordance with the movement of the vehicle 1. In the example embodiment, it is possible to perform a reliable determination favorably adapted to such a change in the turn-over situation.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. In the example embodiment above, described is a case where the vehicle 1 is to roll in the left-right direction and to roll over.

In addition to such a case, an example embodiment of the disclosure may be used, for example, in a determination regarding a turn-over of the vehicle 1 in a pitch direction or in a determination regarding a turn-over of the vehicle 1 in a yaw direction.

The ECU 16 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 16. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 16 illustrated in FIG. 3.

The invention claimed is:

1. A vehicle turn-over determination apparatus comprising:
 a turn-over sensor configured to detect a value of a turn-over angle or a turn-over velocity of a vehicle;
 a memory that stores determination-threshold information to be used in a determination of a turn-over of the vehicle;
 a determination processor configured to perform the determination of the turn-over of the vehicle on a basis of the value detected by the turn-over sensor and the determination-threshold information held in the memory; and a road-surface detector configured to detect a road surface that is present in a traveling direction of the vehicle, wherein:

the determination processor is configured to:
  acquire the determination-threshold information from the memory,
  vary the determination-threshold information acquired from the memory in accordance with an inclination of the road surface which is present in the traveling direction of the vehicle and detected by the road-surface detector, and thereby generate adjusted-threshold information adjusted in accordance with the inclination of the road surface, and
  compare the adjusted-threshold information and the value detected by the turn-over sensor with each other, and thereby perform the determination of the turn-over of the vehicle, the memory stores, as the determination-threshold information,
  information regarding a first determination threshold related to the turn-over of the vehicle in a left direction, and
  information regarding a second determination threshold related to the turn-over of the vehicle in a right direction, the first determination threshold comprises a first roll angle threshold (D1), a second roll angle threshold (D2), a first roll velocity threshold (V1) and a second roll velocity threshold (V2), an absolute value of the first roll angle threshold (D1) being greater than an absolute value of the second roll angle threshold (D2), and an absolute value of the first roll velocity threshold (V1) being greater than an absolute value of the second roll velocity threshold (V2), the second determination threshold comprises a third roll angle threshold (D3), a fourth roll angle threshold (D4), a third roll velocity threshold (V3) and a fourth roll velocity threshold (V4), an absolute value of the third roll angle threshold (D3) being greater than an absolute value of the fourth roll angle threshold (D4), and an absolute value of the third roll velocity threshold (V3) being greater than an absolute value of the fourth roll velocity threshold (V4), the determination processor is configured to determine:
  the vehicle terns over in the right direction
    (i) when, under a condition that an absolute value of a roll angle to the right direction exceeds the absolute value of the first roll angle threshold (D1), an absolute value of a roll velocity in the right direction exceeds the absolute value of the first roll velocity (V1);
    (ii) when, under a condition that the absolute value of the roll velocity in the right direction exceeds the absolute value of the second roll velocity (V2), the absolute value of the roll angle to the right direction exceeds the absolute value of the second roll angle threshold (D2); and
    (iii) when, under a condition that the absolute value of the roll angle to the right direction does not exceed the absolute value of the first roll angle threshold (D1) and the absolute value of the roll velocity in the right direction does not exceed the absolute value of the second roll velocity (V2), the absolute value of the roll velocity and the absolute value of the roll angle exceeds a line connecting a point (V1, D1) and a point (V2, D2) on a graph having a horizontal axis corresponds to the roll velocity and a vertical axis corresponding to the roll angle, and the vehicle terns over in the left direction
    (i) when, under a condition that an absolute value of a roll angle to the left direction exceeds the absolute value of the third roll angle threshold (D3), the absolute value of a roll velocity in the left direction exceeds the absolute value of the third roll velocity (V3);
    (ii) when, under a condition that the absolute value of the roll velocity in the left direction exceeds the absolute value of the fourth roll velocity (V4), the absolute value of the roll angle to the left direction exceeds the absolute value of the fourth roll angle threshold (D4); and
    (iii) when, under a condition that the absolute value of the roll angle to the left direction does not exceed the absolute value of the third roll angle threshold (D3) and the absolute value of the roll velocity in the left direction does not exceed the absolute value of the fourth roll velocity (V4), the absolute value of the roll velocity and the absolute value of the roll angle exceeds a line connecting a point (V3, D3) and a point (V4, D4) on the graph, the determination processor is configured to, upon generating the adjusted-threshold information,
  vary the determination-threshold information and thereby (i) decreasing the absolute value of the first roll angle threshold (D1), the absolute value of the second roll angle threshold (D2), the absolute value of the first roll velocity threshold (V1) and the absolute value of the second roll velocity threshold (V2), and (ii) increasing the absolute value of the third roll angle threshold (D3), the absolute value of the fourth roll angle threshold (D4), the absolute value of the third roll velocity threshold (V3) and the absolute value of the fourth roll velocity threshold (V4), in a case where the road-surface detector has detected that the road surface which is present in the traveling direction of the vehicle descends leftward, and
  vary the determination-threshold information and thereby (i) increasing the absolute value of the first roll angle threshold (D1), the absolute value of the second roll angle threshold (D2), the absolute value of the first roll velocity threshold (V1) and the absolute value of the second roll velocity threshold (V2) and (ii) decreasing the absolute value of the third roll angle threshold (D3), the absolute value of the fourth roll angle threshold (D4), the absolute value of the third roll velocity threshold (V3) and the absolute value of the fourth roll velocity threshold (V4), in a case where the road-surface detector has detected that the road surface which is present in the traveling direction of the vehicle descends rightward.

2. A vehicle comprising:
the vehicle turn-over determination apparatus according to claim 1; and
an onboard device operable upon the turn-over of the vehicle, the onboard device comprising an occupant protection device, wherein
the onboard device is configured to operate in a case where the vehicle turn-over determination apparatus determines the turn-over of the vehicle.

3. The vehicle turn-over determination apparatus according to claim 1, wherein, in the case where the road-surface detector has detected that the road surface which is present in the traveling direction of the vehicle descends leftward, the determination processor is configured to:

calculate a first value so that the first value increases as an inclination angle of the road surface with respect to a horizontal plane increases;

calculate a second value so that the second value increases as the inclination angle of the road surface with respect to the horizontal plane increases;

decrease the absolute value of the first roll angle threshold (D1) and the absolute value of the second roll angle threshold (D2) by the first value;

decrease the absolute value of the first roll velocity threshold (V1) and the absolute value of the second roll velocity threshold (V2) by the second value;

increase the absolute value of the third roll angle threshold (D3) and the absolute value of the fourth roll angle threshold (D4) by the first value; and increase the absolute value of the third roll velocity threshold (V3) and the absolute value of the fourth roll velocity threshold (V4) by the second value, and wherein, in the case where the road-surface detector has detected that the road surface which is present in the traveling direction of the vehicle descends rightward, the determination processor is configured to:

calculate a third value so that the third value increases as an inclination angle of the road surface with respect to the horizontal plane increases;

calculate a fourth value so that the fourth value increases as the inclination angle of the road surface with respect to the horizontal plane increases;

increase the absolute value of the first roll angle threshold (D1) and the absolute value of the second roll angle threshold (D2) by the third value;

increase the absolute value of the first roll velocity threshold (V1) and the absolute value of the second roll velocity threshold (V2) by the fourth value;

decrease the absolute value of the third roll angle threshold (D3) and the absolute value of the fourth roll angle threshold (D4) by the third value; and decrease the absolute value of the third roll velocity threshold (V3) and the absolute value of the fourth roll velocity threshold (V4) by the fourth value.

4. The vehicle turn-over determination apparatus according to claim 3, wherein the road-surface detector comprises a vehicle outside camera configured to capture an image including the road surface, and is configured to (i) detect whether the road surface descends leftward or rightward and (ii) detect the inclination angle of the road surface with respect to the horizontal plane on a basis of the captured image.

* * * * *